US011931606B2

(12) United States Patent
Yang et al.

(10) Patent No.: US 11,931,606 B2
(45) Date of Patent: Mar. 19, 2024

(54) ANTI-TORQUE SAFETY HOOK

(71) Applicant: BEXUS INDUSTRIES CO., LTD., Taichung (TW)

(72) Inventors: Kai Chieh Yang, Taichung (TW); Yi-Ching Lin, Taichung (TW)

(73) Assignee: BEXUS INDUSTRIES CO., LTD., Taichung (TW)

( * ) Notice: Subject to any disclaimer, the term of this patent is extended or adjusted under 35 U.S.C. 154(b) by 321 days.

(21) Appl. No.: 17/232,082

(22) Filed: Apr. 15, 2021

(65) Prior Publication Data

US 2022/0266074 A1 Aug. 25, 2022

(30) Foreign Application Priority Data

Feb. 22, 2021 (TW) .................................. 110106135

(51) Int. Cl.
*A62B 35/00* (2006.01)
*F16B 45/02* (2006.01)
(52) U.S. Cl.
CPC ...... *A62B 35/0037* (2013.01); *A62B 35/0081* (2013.01); *F16B 45/02* (2013.01); *F16B 45/023* (2021.05)
(58) Field of Classification Search
CPC . A62B 35/0037; A62B 35/0081; F16B 45/02; F16B 45/023

(Continued)

(56) References Cited

U.S. PATENT DOCUMENTS 7,922,220 B2 * 4/2011 Coulombe .............. F16B 45/02
                                                    24/600.1
8,752,254 B2 * 6/2014 Perner .................... F16B 45/02
                                                    24/600.1
(Continued)

FOREIGN PATENT DOCUMENTS

CA          2972184 A1 * 12/2017 .............. F16B 45/02
DE    202009003905 U1 *  8/2009 .............. F16B 45/02
(Continued)

*Primary Examiner* — Taylor Morris
(74) *Attorney, Agent, or Firm* — Che-Yang Chen; Law Office of Michael Chen

(57) ABSTRACT

An anti-torque safety hook includes a main body, a gate member, and a detent member. The main body has a hook opening passing through the front and back sides thereof, a passage communicating to the right side of the hook opening, a female buckle arranged on the passage, a connection unit arranged below the hook opening, and an energy absorption area arranged on the left side of the hook opening. The gate member has a first end mounted on the main body and a second end comprising a male buckle, adapted for detachably coupled with the female buckle, so as to allow the gate member to open and close the passage. The detent member is coupled on the main body and maintained at a first position, so as for ensuring that the gate member closes the passage, while when the detent member is operated and switched to a second position, the safety is disarmed. The present invention mainly utilizes the detent member to ensure the gate member to close the passage. When the main body bears the designated torque, the energy absorption area allows the main body to distort in response while the gate member may still close the passage, so as to prevent the risk of decoupling and in order to meet the standard of ANSI/ASSP Z359.12-2019.

7 Claims, 10 Drawing Sheets

(58) Field of Classification Search
USPC ........................................................ 294/82.2
See application file for complete search history.

(56) References Cited

U.S. PATENT DOCUMENTS

| | | | | |
|---|---|---|---|---|
| 9,091,295 | B1* | 7/2015 | Yang | A62B 35/0037 |
| 9,707,419 | B2* | 7/2017 | Perner | A62B 35/0037 |
| 10,202,260 | B2* | 2/2019 | Costa | B66C 1/10 |
| 10,384,086 | B2* | 8/2019 | Kekahuna | F16B 45/02 |
| 10,415,627 | B1* | 9/2019 | Chen | F16B 1/02 |
| 11,433,263 | B1* | 9/2022 | Bishop | F16B 45/02 |
| 2002/0121236 | A1* | 9/2002 | Besson | F16B 45/02 |
| | | | | 116/212 |
| 2005/0172461 | A1* | 8/2005 | Hall | A63B 29/02 |
| | | | | 24/599.9 |
| 2011/0094839 | A1* | 4/2011 | Blomberg | A62B 35/04 |
| | | | | 219/121.72 |
| 2012/0104187 | A1* | 5/2012 | Kramer | F16B 45/02 |
| | | | | 248/74.3 |
| 2012/0210542 | A1* | 8/2012 | Yang | F16B 21/165 |
| | | | | 24/369 |
| 2017/0183910 | A1* | 6/2017 | Roth | A62B 35/0062 |
| 2021/0128955 | A1* | 5/2021 | Marak | A62B 35/0081 |
| 2021/0178202 | A1* | 6/2021 | Carroccia | A62B 35/0018 |
| 2021/0299490 | A1* | 9/2021 | Sulc | A62B 35/0081 |

FOREIGN PATENT DOCUMENTS

| | | | | |
|---|---|---|---|---|
| DE | 102018108916 A1 | * | 10/2019 | ............. F16B 45/02 |
| EP | 2952654 A1 | * | 12/2015 | ......... A61B 35/0062 |
| GB | 2106584 A | * | 4/1983 | ................ B66C 1/36 |
| JP | 08024352 A | * | 1/1996 | ............. A62B 35/04 |
| KR | 20210001511 U | * | 7/2021 | ............. F16B 15/02 |
| KR | 102497678 B1 | * | 2/2023 | ................ B66C 1/36 |
| WO | 20090009567 U | * | 8/2015 | ............. F16B 45/02 |
| WO | WO-2015126878 A1 | * | 8/2015 | ......... A61B 35/0037 |
| WO | WO-2018236914 A1 | * | 12/2018 | ......... A62B 35/0068 |
| WO | WO-2020150212 A1 | * | 7/2020 | ......... A62B 35/0025 |

* cited by examiner

ANTI-TORQUE SAFETY HOOK

BACKGROUND OF THE PRESENT INVENTION

Field of Invention

The present invention relates to the field of safety hook, and more particularly to an anti-torque safety hook that meets the standard of ANSI/ASSP Z359.12-2019.

Description of Related Arts

It is noted that every personnel has to fasten a safety belt under an upper air operation scenario, such as rock climbing, mountain climbing, building construction, and etc. The free end of the safety belt has a safety hook connected thereon for buckling with a preset upper air anchor point, so that when the person falls, s/he will be hung in the air and allowed to wait for rescue.

However, when the person falls, the safety hook bears not only downward pulling force and impact, but also torque from side impact of the anchor point or upper air environment. Therefore, there is a standard of ANSI/ASSP Z359.12-2019 Connecting Components for Personal Fall Arrest Systems, which further regulates that the safety hook will not be broken or unhooked when the safety hook bears a predetermined torque. Hence, all current manufacturers have to redevelop safety hooks that meet the standard.

SUMMARY OF THE PRESENT INVENTION

The present invention provides an anti-torque safety hook, including:

a main body, having a hook opening passing through the front and back sides thereof, a passage communicating to the right side of the hook opening, a female buckle arranged on the passage, a connection unit arranged below the hook opening, and an energy absorption area arranged on the left side of the hook opening;

a gate member, having a first end mounted on the main body and a second end comprising a male buckle, adapted for detachably coupled with the female buckle, so as to allow the gate member to open and close the passage; and a detent member, coupled on the main body and maintained at a first position, so as for ensuring that the gate member closes the passage, wherein when the detent member is operated and switched to a second position, the safety is disarmed, so that the gate member is operatable for opening the passage, wherein when the detent member is armed when the gate member closes the passage, when the main body bears a designated torque, the energy absorption area allows the main body to distort in response, so as to ensure that the gate member still close the passage.

Accordingly, the present invention utilizes the overall setting of the main body, the energy absorption area, the hook opening, and the passage to meet the standard and requirements of ANSI/ASSP Z359.12-2019, especially the detail criteria of 3.1.3.5 and 3.1.3.6 of the standard.

DETAILED DESCRIPTION OF THE PREFERRED EMBODIMENT

Figure 1:
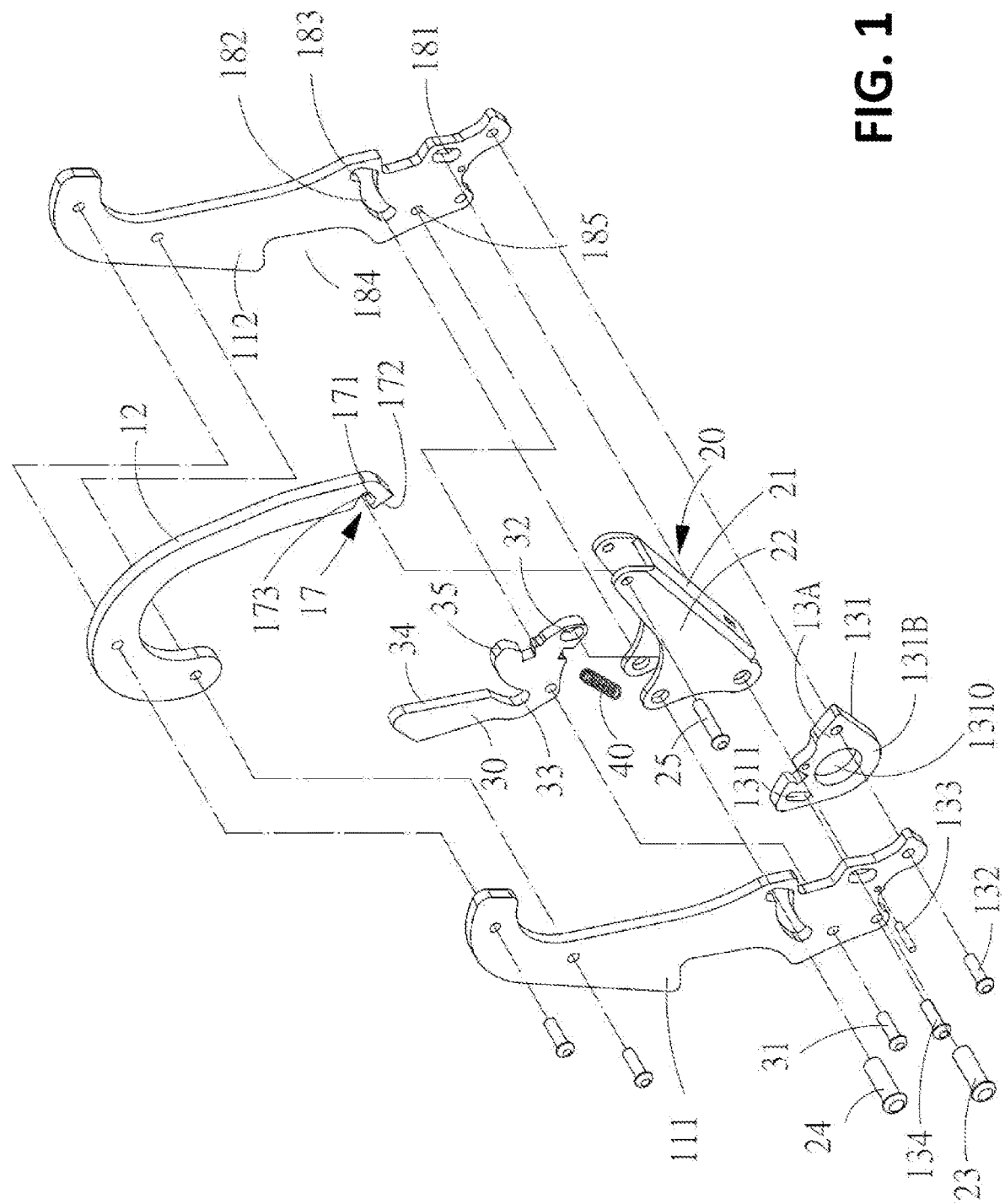
FIG. 1 is an exploded view of the present invention.
Figure 2:
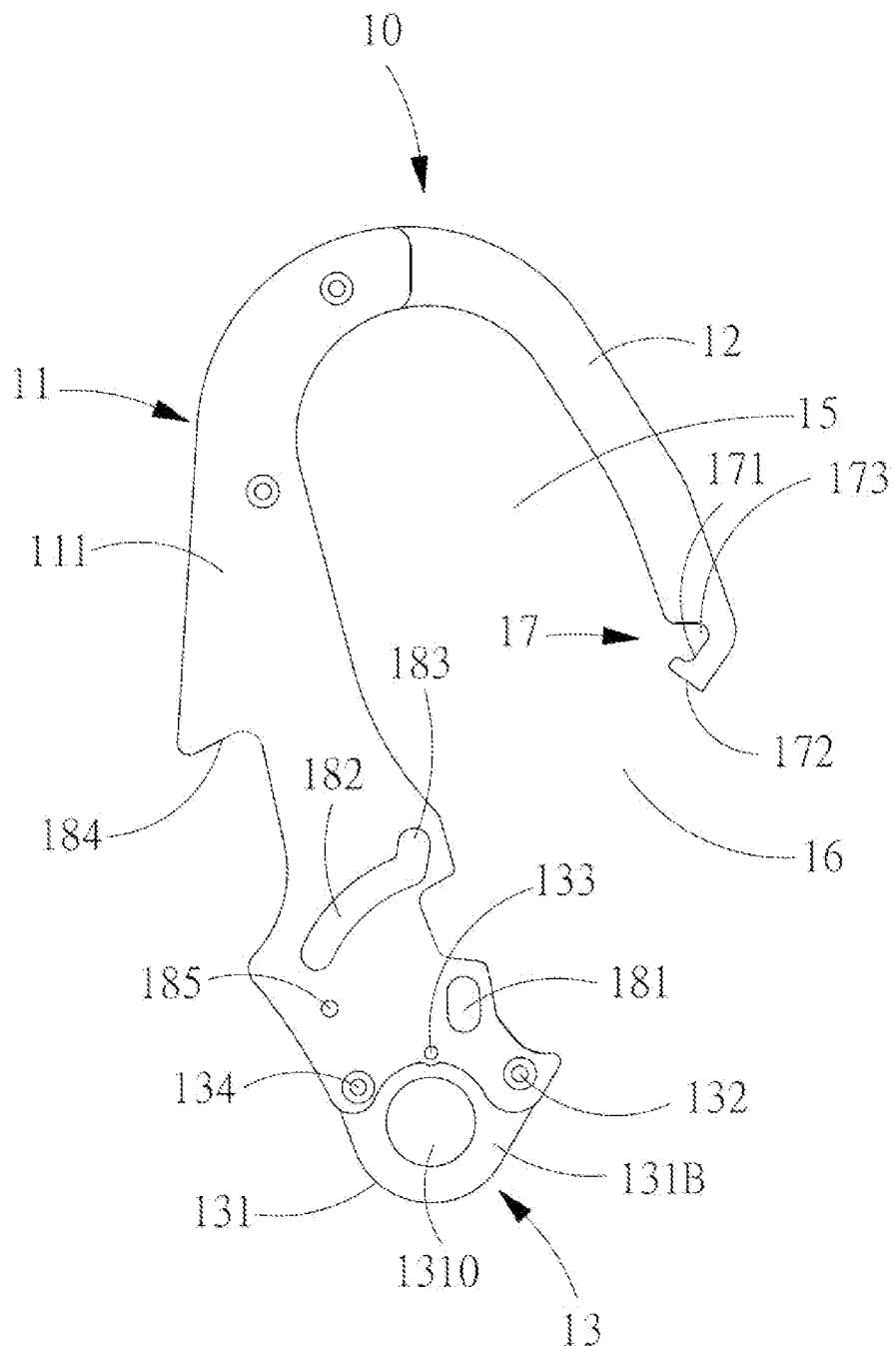
FIG. 2 is a front view of an assembled main body according to the present invention.
Figure 3:
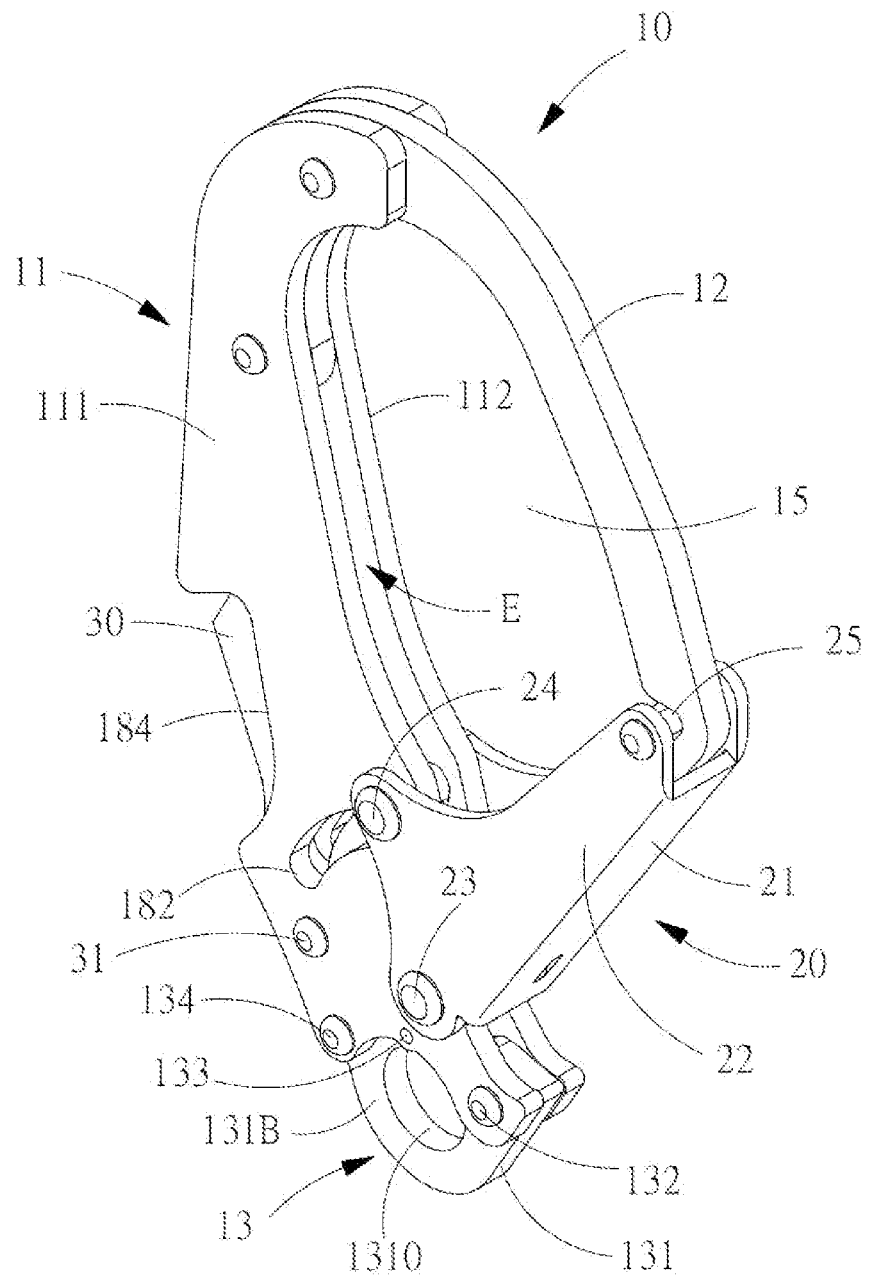
FIG. 3 is a perspective view of an assembly according to the present invention.
Figure 4:
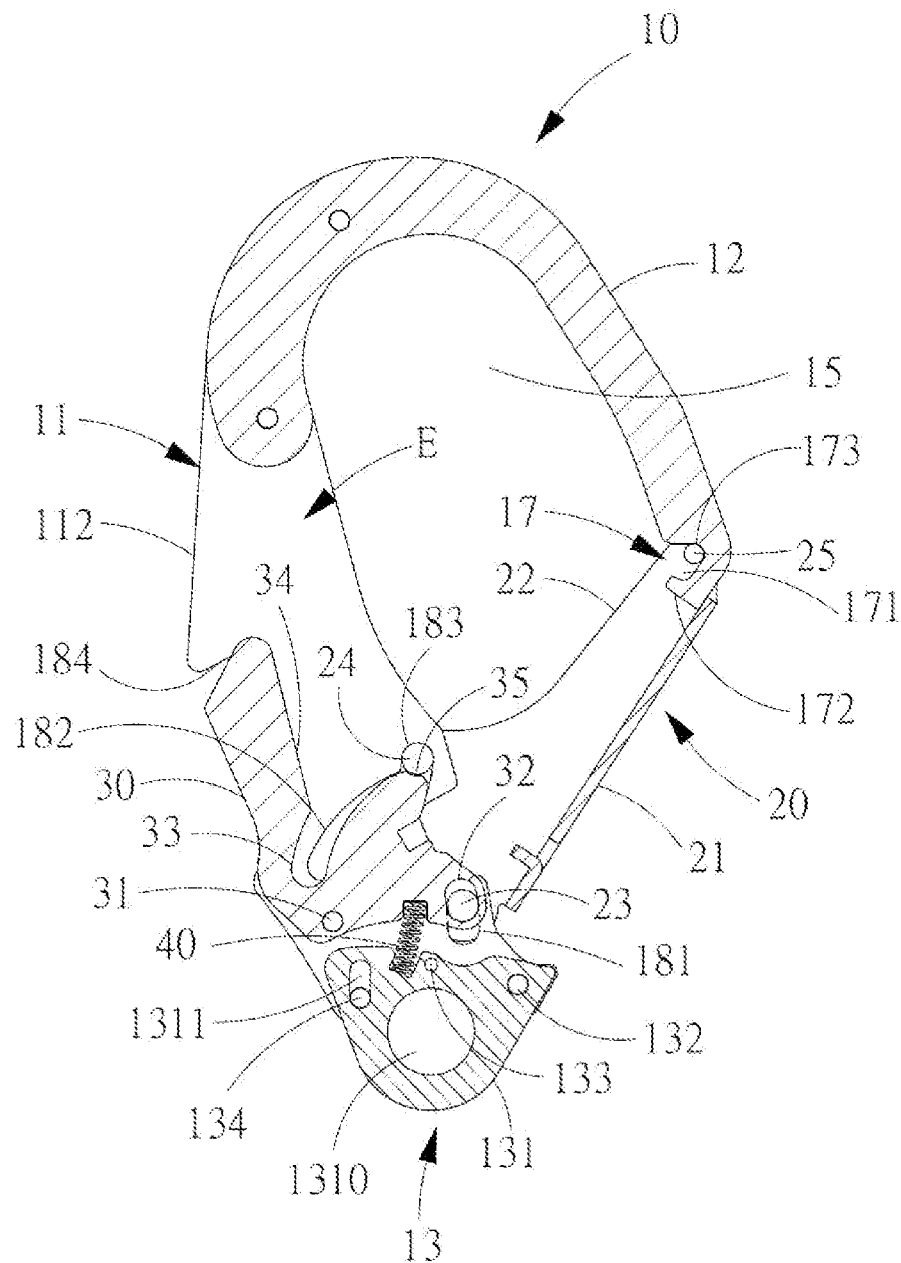
FIG. 4 is a sectional view of the assembly according to the present invention.
Figure 5:
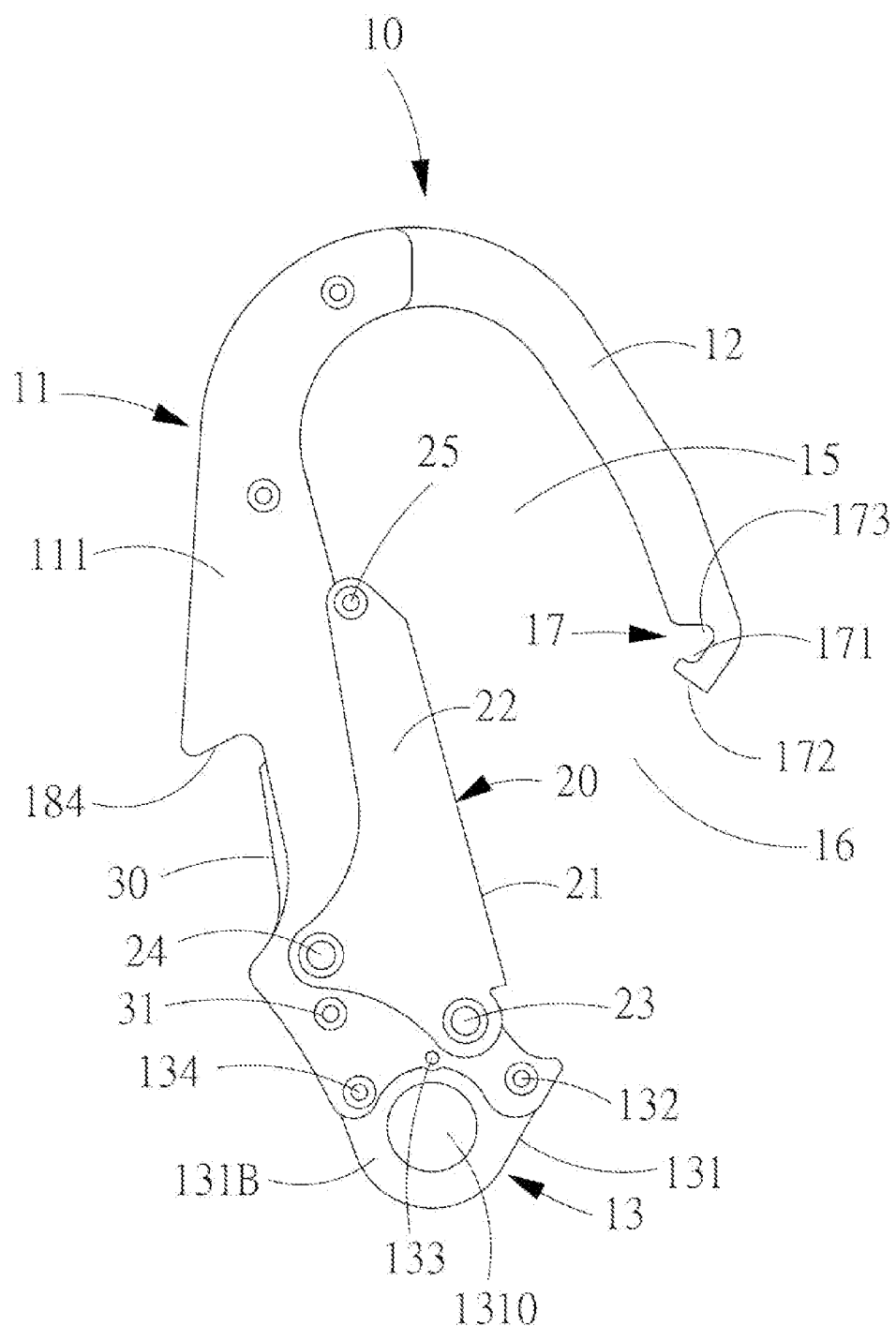
FIG. 5 is a front view illustrating a passage being forcefully opened according to the present invention.
Figure 6:
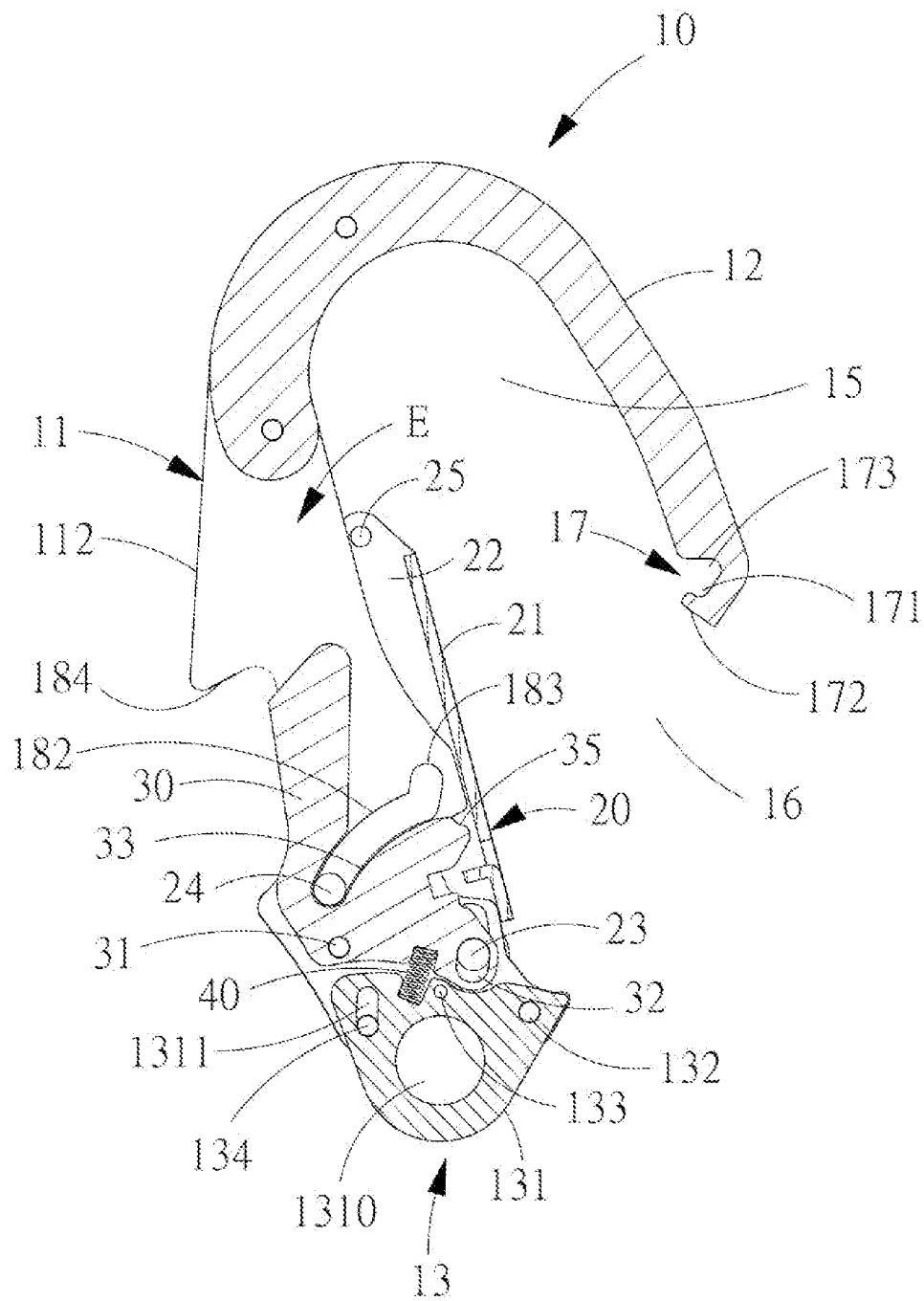
FIG. 6 is a sectional view of FIG. 5.

Referring to FIGS. 1-7, the present invention provides an anti-torque safety hook, including a main body 10 with a gate member 20, a detent member 30, and a spring 40 arranged thereon.

The main body 10 includes a main arm 11, a hook arm 12, a connection unit 13, and an energy absorption area E.

The main arm 11 has a symmetrically shaped front board 111 and back board 112, wherein an end of the hook arm 12 is affixed between the top end of the front board 111 and the top end of the back board 112 in a clamping manner. Besides, the hook arm 12 is riveted on the top end of the main arm 11 in an integrally connected manner, so as to define a hook opening 15 on the main body 10 that penetrates in the front and back direction. A passage 16 is provided to communicate with the hook opening 15 from the right side thereof between the right side (as illustrated in the drawings) of the main arm 11 and the free end of the hook arm 12, so as to allow an anchor point in the upper air to be buckled into the hook opening 15. After the gate member 20 closes the passage 16, the anchor point will be capable of supporting the main body 10 without decoupling or escaping therefrom. The hook arm 12 has a female buckle 17 arranged on the free end thereof. The female buckle 17 is located above the passage 16 and has a slot 171 communicating with the hook opening 15, a mouth piece 172 arranged between the slot 171 and the passage 16, and a deep area 173 connected and communicated with the top end of the slot 171. Besides, a first groove 181 penetrates the front board 111 and the back board 112 below the passage 16. A second groove 182 is provided in a penetrating manner above the first groove 181, wherein the second groove 182 is arranged in a curvy manner for the first groove 181 as the center, wherein the right side of the second groove 182 is upwardly connected with a third groove 183. A fourth groove 184 is provided and arranged above the second groove 182 on the left side of the front board 111 and the back board 112. A first hole 185 provided in a penetrated manner between the left ends of the first groove 181 and the second groove 182.

Figure 7:
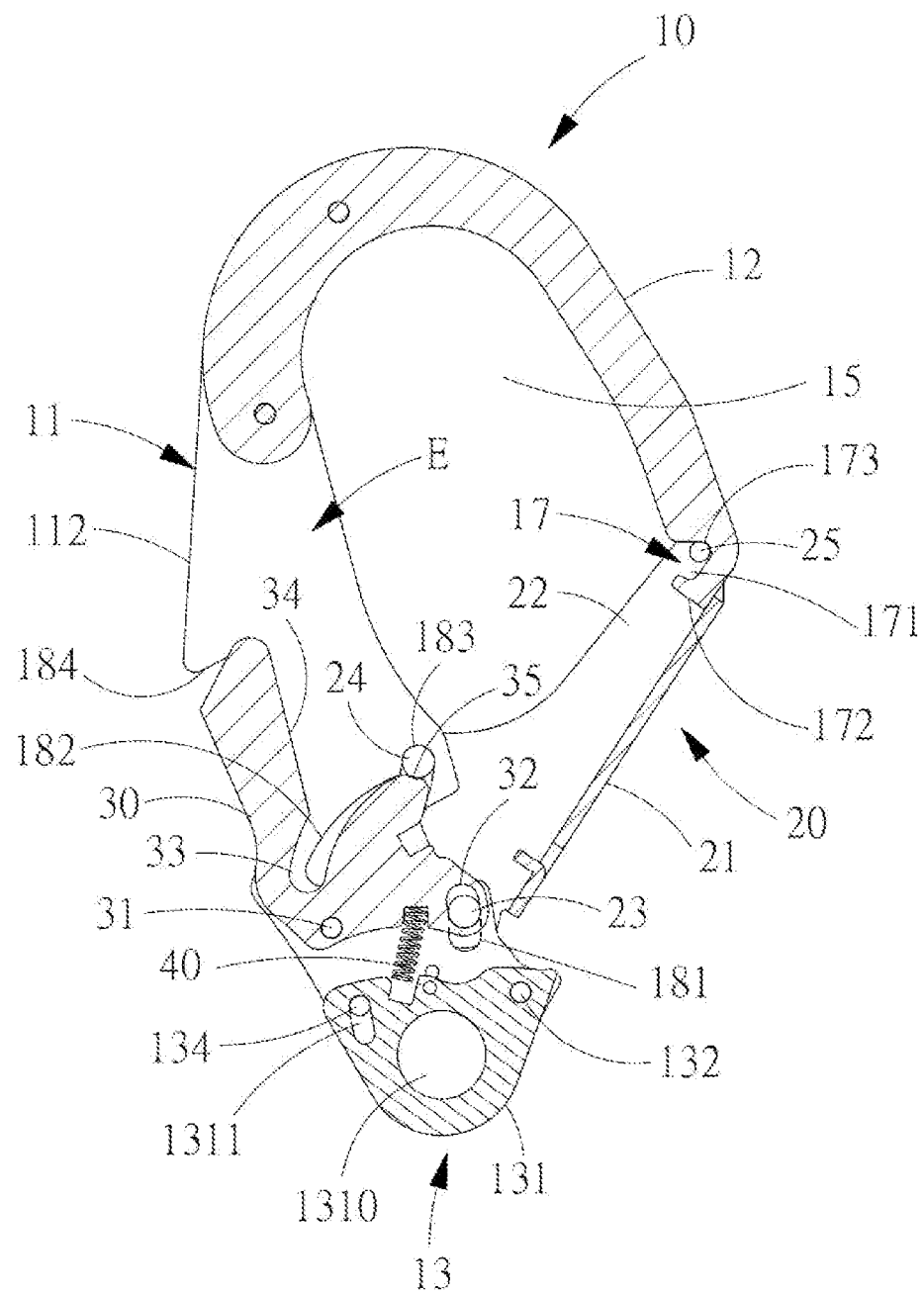
FIG. 7 is a perspective view illustrating the connection unit according to the present invention when buffering falling person.

The connection unit 13 is mounted on the main arm 11 below the hook opening 15 and the first groove 181 and is formed by the intermediate block 131, the main bolt 132, and the breaking bolt 133, wherein the intermediate block 131 has a covered portion 131A and a bare portion 131A, wherein the covered portion 131A is clamped between the bottom end of the front board 111 and the bottom end of the back board 112 and is affixed through the pinning of the main bolt 132 and the breaking bolt 133 so as to be integrally bonded. The main bolt 132 and the breaking bolt 133 are parallel to each other. The strength of the breaking bolt 133 is weaker than it of the main bolt 132. The bare portion 131B has a hanging hole penetratingly arranged thereon. The hanging hole 1310 is for the connection of the safety belt on the back of the user, so that the impact rendered by the falling of the user will be exerted onto the main arm 11 through the intermediate block 131. As a result, as illustrated in FIG. 7, during the process that the main bolt 132 and the breaking bolt 133 transfer the impact to the main body 10, the breaking bolt 133 will break first, so as to first buffer the impact in order to reduce the force exerted to the front board 111 and the back board 112, such that the front board 111 and the back board 112 may gradually distort based on the design to respond to the force and keep hanging the user in the air, rather than lead danger of breaking the main body 10. In order to reduce unnecessary wobbling of the user hanging in the air due to utilizing the main bolt 132 as the point of support after the breaking bolt 133 has broken from the intermediate block 131. A chute 1311 may be provided and arranged at the covered portion 131A of the intermediate block 131 and a guide bolt 134 may be provided and affixedly arranged on the front board 111 and the back board 112 to penetrate the chute 1311, so that when the breaking bolt 133 has not broken, the guide bolt 134 is kept at the original position of the chute 1311, while when the breaking bolt 133 has broken, the chute 1311 will position the guide bolt 134 to a designated position, so that the intermediate block 131 may both rely on the main bolt 132 and the guide bolt 134 to support the hanging of the user. Preferably, the breaking bolt 133 is located between the main bolt 131 and the guide bolt 134. It is worth noticing that according to the present invention, the intermediate block 131 may have a warning sign (not shown in the figures) arranged on the covered portion 131A, such that when the main body 10 bears a relatively low impact that only breaks the breaking bolt 133 while the main body 10 has not distorted, as illustrated in FIG. 7, the warning sign will be revealed, so as to warm the user not to repetitively utilize the device subsequently, but to send it to the manufacturer for services.

The energy absorption area E is arranged on the main arm 11, so as to be on the left side of the hook opening 15 and face to the female buckle 17 and the passage 16. The energy absorption area E is located between the hook arm 12 and the connection unit 13 and a channel is formed and provided between the back side of the front board 111 and the front side of the back board 112. The top end of the energy absorption area E is clamped and held between the front board 111 and the back board 112 through an end of the hook arm 12. The bottom end of the energy absorption area E is clamped and held between the front board 111 and the back board 112 through the covered portion 131A of the intermediate block 131. Accordingly, the energy absorption area E has an inner wall arranged in an oblong-shaped manner and laterally passing through the left and right side of the main arm 11, so that the right end of the energy absorption area E communicates with the hook opening 15 and both the female buckle 17 and the passage 16 are arranged to be in the right area of the energy absorption area E, so that when the main body 10 bears a predetermined torque, the energy absorption area E has enough allowance for not only the front board 111 and the back board 112 to distort in response, but also the buffer provided for the female buckle 17 and the gate member 20. The first groove 181, the second groove 182, the third groove 183, the fourth groove 184, and the first hole 185 are all in the lower portion of the energy absorption area E. In order for the front board 111 and the back board 112 to gradually distort based on the design, the front board 111 and the back board 112 according to the present invention utilize material with better toughness, while the hook arm 12 and the intermediate block 131 utilize metal material with higher rigidity. In fact, according to the present invention, the toughness of the front board 111 and the back board 112 is greater than the toughness of the hook arm 12 and the intermediate block 131, while the rigidity of the front board 111 and the back board 112 is weaker than the rigidity of the hook arm 12 and the intermediate block 13, so as to prevent breaking of the main body 10 when bearing a predetermined torque. Similarly, the main arm 11 and the hook arm 12 may be integrally formed with the same material and be further shaped through cutting or forming, so as to form the energy absorption area E on the main arm 11, which allows the energy absorption area E to have an oblong-arranged inner wall and laterally pass through the left and right side of the main arm 11; this may be an equivalence of the present invention.

The section of the gate member 20 is approximately in a reverse-U shape, so as to have a baffle 21 capable of closing the passage 16 and two side boards symmetrically bent from the two sides of the baffle 21, wherein the two side boards respectively have a first end and a second end opposite to each other, wherein the first end covers the first groove 181 and the third groove 183 so as to bridge with the first axle 23 that passes through the upper part of the first groove 181 and to bridge with the second axle 24 that passes through the third groove 183, such that the first end of the gate member 20 can be mounted on the main arm 11 through two pivots. A male buckle 25 is bridged and connected with the two side boards 22 on the second end of the gate member 20. The male buckle 25 is buckled into the slot 171 of the female buckle 17 and limited in the deep area 173 so as to have the gate member 20 close the passage 16. If the passage 16 is to be opened, the detent member 30 has to be pressed, so as to force the gate member 20 to move downward so as to move the first axle 23 to the lower part of the first groove 181 and to move the second axle 24 downward to the second groove 182 at the same time, which drives the male buckle 25 to move downward and escape from the deep area 173. Then the gate member 20 may be forced to swing counterclockwise toward the inside of the hook opening 15 with the first axle 23 as the pivot, so as to drive the second axle 24 to move along the second groove 182 and to drive the male buckle 25 to decouple and escape from the slot 171 of the female buckle 17, so as to allow the gate member 20 to open the passage 16. When the gate member 20 abuts against the right side of the main arm 11, the passage 16 is completely opened.

The detent member 30 is slidingly arranged on the lower portion of the energy absorption area E of the main arm 11 and coupled with the first hole 185 through the third axle 31. Besides, the detent member 30 also has a fifth groove 32 arranged thereon corresponding to the first groove 181, wherein the fifth groove 32 is for the first axle 23 to pass therethrough, so that the detent member 30 can be pivotally coupled with the main arm 11 through the first axle 23 and the third axle 31 and able to reach in and out in the fourth groove 184 in order to shift between the first position and the second position. In fact, the detent member 30 has a sixth groove 33 with the same radian measure with the second groove 182. The right side of the sixth groove 33 is arranged in an open manner and has a pushing and drawing side 34 connected upward and a locking side 35 extended downward. When the gate member 20 closes the passage 16, which positions the second axle 24 in the third groove 183, the locking side 35 will abut against the bottom end of the second axle 24, so as to ensure and secure closure of the passage 16 by the gate member 20. At this moment, the detent member 30 is maintained at the first position. Here, the detent member 30 in the fourth groove 184 is in an extended mode. However, when the detent member 30 is pressed and turned into a retracted mode in the fourth groove 184, the detent member 30 will be switched to a second position, which drives the locking side 35 to release the second axle 24 for disarming the above mentioned safety, so as to allow the gate member 20 to move down subsequently, which, at the same time, overlaps the sixth groove 33 and the second groove 182, shifts the first axle 23 to the lower part of the fifth groove 32 and first groove 181, moves the second axle 24 down into the second groove 182 and the sixth groove 33, as well as withdraws the male buckle 25 from the deep area 173. Then, the gate member 20 may be swung counterclockwise toward the inside of the hook opening 15 with the first axle 23 as the pivot, so as to drive the second axle 24 to move along the second groove 182 and the sixth groove 33 to decouple and disengage the male buckle 25 from the female buckle 17, so as for opening the passage 16, which allows the device of the present invention to buckle with a preset upper air anchor point.

The spring 40 is mounted between the detent member 30 and intermediate block 131, so as to provide a predetermined force for the detent member 30, so as to keep the detent member 30 at the first position to ensure and secure that the gate member 20 close the passage 16, such that the anchor point will not escape from the hook opening 15. However, when the user falls and uses the present invention to bear the predetermined torque brought by the side impact of the anchor point or upper air environment, the bottom end of the main body 10 can be relatively bent upward, so that the energy absorption area E allows the main arm 10 to distort in response. Meanwhile, the energy absorption area E can also provide buffer the gate member 20, the male buckle 25, and the female buckle 17 at the same time, so as to prevent the male buckle 25 from leaving and disengaging from the female buckle 17, so as to ensure and secure that the gate member 20 is able to maintain closing the passage 16, which therefore prevents the anchor point from escaping and decoupling and meets the standard of ANSI/ASSP Z359.12-2019.

Figure 8:
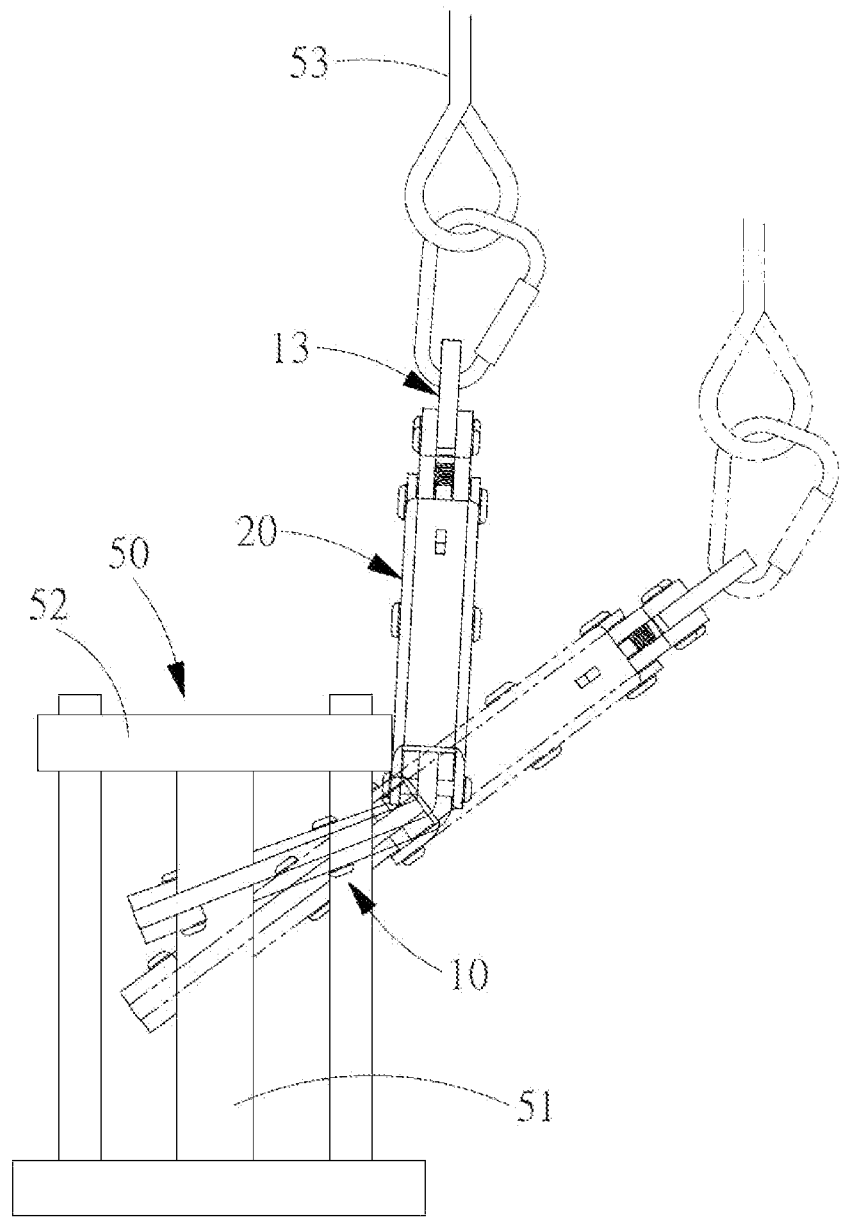
FIG. 8 is a perspective view illustrating a jig utilized in simulating and testing the designated torque holding.
Figure 9:
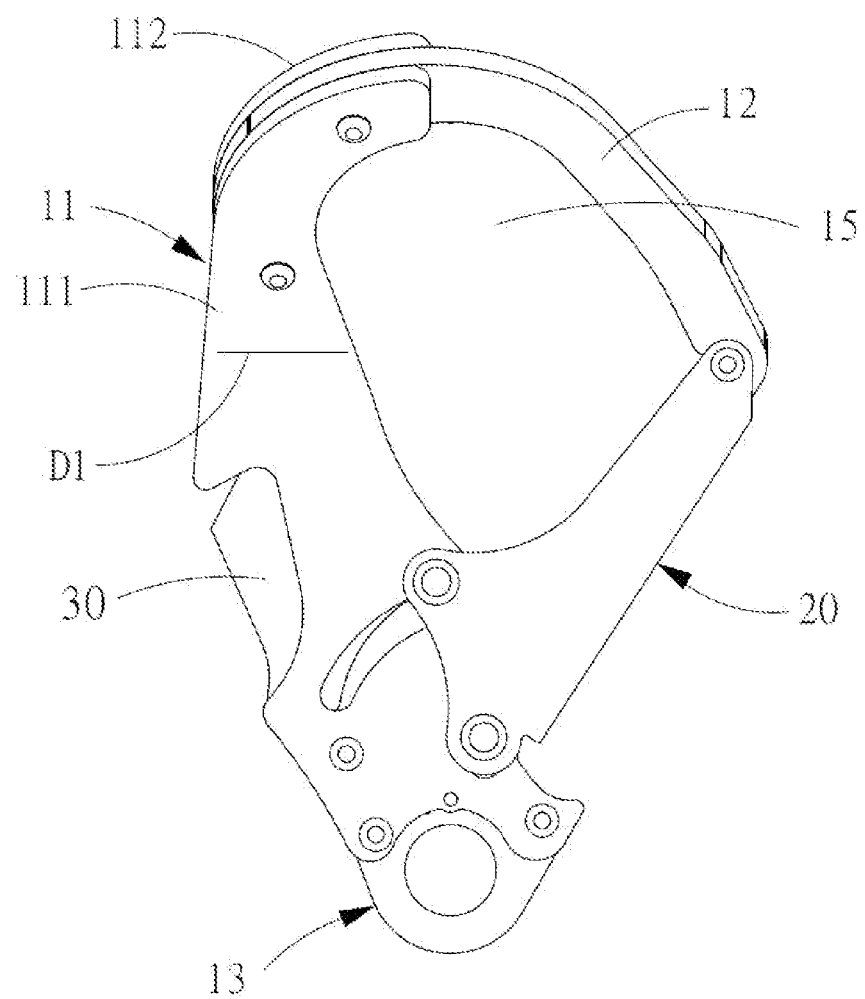
FIG. 9 is a front view illustrating the present invention after the simulation and test of the designated torque holding.
Figure 10:
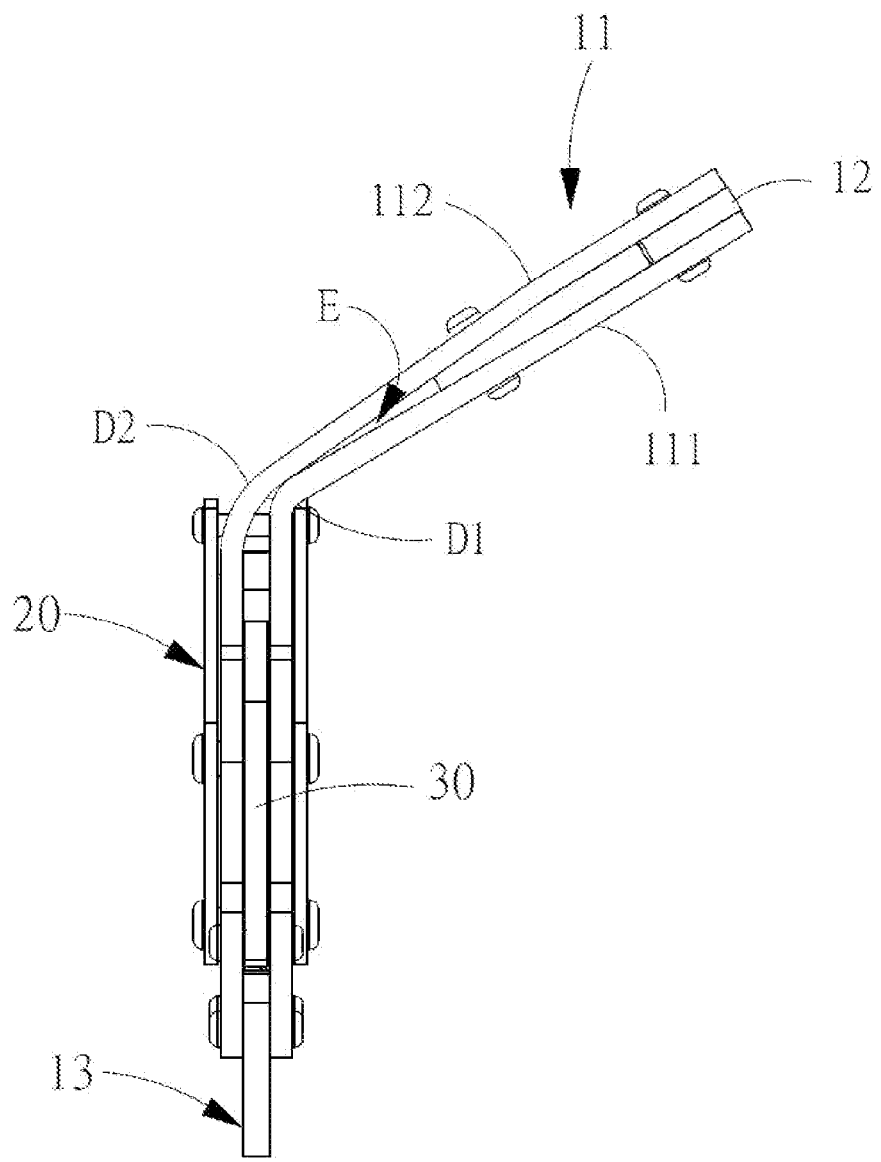
FIG. 10 is a left view of FIG. 9.

Referring to FIGS. 8-10, the manner that the anti-torque safety hook of the present invention is able to meet the criteria of the 3.1.3.5 and 3.1.3.6 of the above-mentioned standard is further illustrated. A column 51 of a jig 50 is utilized to simulate an anchor point for the anti-torque test for the main body 10 and the gate member 20, wherein the jig 50 has a resistance base 52 radially protruded and provided on an end of the column 51. The gate member 20 and the detent member 30 are operated to locked the column 51 within the hook opening 15. Then, a power source 53 linked to the connection unit 13 is utilized to provide a stress force to simulate the falling of a personnel. Therefore, when the power source 53 is turned on, the upper end and the lower end of the main body 10 will bear a predetermined torque due to the extrusion and side impact from the resistance base 52. As a result, the lower end of the main body 10 will be pushed to bend toward the upper end of the main body 10 relatively, Here, according to the present invention, the energy absorption area E is certainly capable of allowing the main arm 11 to distort in response, which allows the portion of the back board 112 abutting against the resistance base 52 to be pushed and bent toward the energy absorption area E and create a pressing zone D1. As for the portion corresponding to the front board 111 may create a stretching zone D2 due to the bent and distorted energy absorption area E. Because the gate member 20, male buckle, and female buckle are in the right area of the energy absorption area E, the pressing zone D1 and the stretching zone D2 not only keep the main body 10 from being broken, but also effectively control the male buckle from releasing the female buckle, so that the gate member 20 can still stay closing the hook opening 15, which therefore prevents the hook opening 15 from disengaging from the column 51 (anchor point).

According to the present invention, the anti-torque safety hook mainly utilizes the distortion of the energy absorption area E to absorb most of the predetermined torque so as to prevent the main body 10 from being broken and prevent the gate member 20 from opening the passage 16. In this sense, the parameters of the front board 111 and the back board 112, such as thickness, material, distance therebetween, and etc., may vary.

In view of above, the overall structure and arrangement of the anti-torque safety hook according to the present invention is novel and advantageous, which is certainly a great creation of a technical construct and shall match the conditions of patent application. Therefore, it is applied herein in accordance with the law. However, what has been mentioned above is only one of the preferred embodiments of the present invention, which shall not be used to limit the scope of the practice of the present invention. In other words, all equivalent alternatives and modifications according to the claims of the present invention shall still be covered by the claimed scope of the present invention.

What is claimed is:

1. An anti-torque safety hook, comprising:
   a main body, having a hook opening passing through the front and back sides thereof, a passage communicating to said hook opening, a female buckle arranged above said passage, a connection unit arranged below said hook opening, and an energy absorption area arranged on a left side of said hook opening, wherein said female buckle and said passage are located on a right side of said energy absorption area;
   a gate member, having a first end mounted on said main body and a second end comprising a male buckle, adapted for detachably coupled with said female buckle, so as to allow said gate member to open and close said passage: and
   a detent member, coupled on said main body and maintained at a first position, so as for ensuring that said gate member closes said passage,
   wherein when said detent member is operated and switched to a second position, a safety is disarmed, so that said gate member is operable for opening said passage, wherein when said detent member is armed when said gate member closes said passage, when said main body bears a designated torque, said energy absorption area allows said main body to distort in response, so as to ensure that said gate member still closes said passage, wherein said main body has a main arm, a hook arm, and the hook opening is defined by connecting said hook arm with a top end of said main arm, wherein the passage is provided and maintained between a free end of said hook arm and a right side of said main arm, wherein said hook arm has the female buckle arranged on the free end thereof, wherein said main arm has the connection unit arranged below said hook opening and the energy absorption area is arranged between said connection unit and said hook arm, and is a channel laterally passing through a left and right side of said main arm, wherein said main arm has a symmetrically shaped front board and back board, wherein an end of said hook arm is affixed between atop end of said front board and a top end of said back board in a clamping manner, wherein said connection unit has an intermediate block affixed between a bottom end of said front board and a bottom end of said back board in a clamping manner, wherein said hook arm and said intermediate block control and keep said energy absorption area between a back side of said front board and a front side of said back board, wherein said connection unit is formed by said intermediate block, a main bolt, and a breaking bolt, wherein said intermediate block has a covered portion and a bare portion, wherein said covered portion is clamped between the bottom end of said front board and the bottom end of said back board and affixed through a pinning of said main bolt and said breaking bolt, wherein the strength of said breaking bolt is lower than the strength of said main bolt, wherein said bare portion has a hanging hole penetrated thereon, wherein said intermediate block has a chute arranged on said covered portion, wherein a guide bolt is provided and maintained to pass through said chute on said front board, said back board in a manner that when said breaking bolt has not been broken, said guide bolt is maintained at the original position in said chute, while when said breaking bolt is broken, said chute will position said guide bolt to a designated position.

2. The anti-torque safety hook, as recited in claim 1, wherein a toughness of said front board and said back board is greater than a toughness of said hook arm and said intermediate block and having a rigidity of said front board and said back board weaker than a rigidity of said hook arm and said intermediate block.

3. An anti-torque safety hook, comprising:
a main body, having a hook opening passing through the front and back sides thereof, a passage communicating to said hook opening, a female buckle arranged above said passage, a connection unit arranged below said hook opening, and an energy absorption area arranged on a left side of said hook opening, wherein said female buckle and said passage are located on a right side of said energy absorption area;
a gate member, having a first end mounted on said main body and a second end comprising a male buckle, adapted for detachably coupled with said female buckle, so as to allow said gate member to open and close said passage; and
a detent member, coupled on said main body and maintained at a first position, so as for ensuring that said gate member closes said passage,
wherein when said detent member is operated and switched to a second position, a safety is disarmed, so that said gate member is operable for opening said passage, wherein when said detent member is armed when said gate member closes said passage, when said main body bears a designated torque, said energy absorption area allows said main body to distort in response, so as to ensure that said gate member still closes said passage, wherein said main body has a main arm, a hook arm, and the hook opening is defined by connecting said hook arm with a top end of said main arm, wherein the passage is provided and maintained between a free end of said hook arm and a right side of said main arm, wherein said hook arm has the female buckle arranged on the free end thereof, wherein said main arm has the connection unit arranged below said hook opening and the energy absorption area is arranged between said connection unit and said hook arm, and is a channel laterally passing through a left and right side of said main arm, wherein said main arm has a symmetrically shaped front board and back board, wherein an end of said hook arm is affixed between atop end of said front board and a top end of said back board in a clamping manner, wherein said connection unit has an intermediate block affixed between a bottom end of said front board and a bottom end of said back board in a clamping manner, wherein said hook arm and said intermediate block control and keep said energy absorption area between a back side of said front board and a front side of said back board, wherein said female buckle is formed by a slot communicated with said hook opening and a deep area connected with said slot, wherein a first groove penetrates said front board and said back board below said passage, wherein a second groove is arranged in a curvy manner with said first groove located at a center of curvature, wherein a right side of said second groove is upwardly connected with a third groove, wherein said gate member has a baffle adapted for closing said passage and two side boards that are bent to be arranged on the two sides of said baffle respectively, wherein said two side boards respectively have a first end and a second end oppositely arranged, wherein said first end covers said first groove and said third groove and bridges with a first axle that passes through said first groove and a second axle that passes through said third groove, wherein said second end of said two side boards bridges with a male buckle embedded in said deep area, so as for said gate member to close said passage, wherein when said passage is to be opened, said gate member has to be forced to shift downward, so as to drive said first axle to move to a lower portion of said first groove, said second axle to move to a lower portion of said second groove, and said male buckle to leave said deep area, rendering said gate member to swing toward said hook opening according to said first axle as the center thereof, which drives said second axle to move along said second groove and decouple said male buckle from said female buckle.

4. The anti-torque safety hook, as recited in claim 3, further comprising a fourth groove arranged above said second groove on the left side of said front board and said back board, and a first hole provided in a penetrated manner between a left end of said first groove and said second groove, wherein said second groove, said third groove, said fourth groove, and said first hole are all located on a lower portion of said energy absorption area, while said female buckle is correspondingly arranged on an upper portion of said energy absorption area, wherein said detent member is slidably arranged on the lower portion of said energy absorption area and coupled with said first hole through a third axle, so as to allow said detent member to reach in and out in said fourth groove and switch between the first position and the second position, wherein said detent member has a fifth groove arranged thereon for said first axle to pass therethrough and a sixth groove arranged thereon matching with said second groove, wherein the right end of said sixth groove is opened and downwardly extended to provide a locking side, so that when said gate member closes said passage and said second axle is in said third groove, said locking side will abut against a bottom end of said second axle and position at the first position to ensure and secure that said gate member closes said passage, wherein when said detent member is switched to the second position, said locking side will release said second axle, rendering said sixth groove and said second groove overlappingly guide said second axle so as to allow said passage to be opened.

5. The anti-torque safety hook, as recited in claim 3, wherein said main arm and said hook arm are made of the same material and are integrally formed, wherein said energy absorption area has an inner wall arranged in an oblong-shaped manner and laterally passing through the left and right side of the main arm.

6. The anti-torque safety hook, as recited in claim 3, further comprising a spring mounted between said detent member and said intermediate block, so that said spring provides a predetermined force onto said detent member to grant said detent member a potential to stay at the first position.

7. An anti-torque safety hook, comprising:
a main body, having a hook opening passing through the front and back sides thereof, a passage communicating to said hook opening, a female buckle arranged above said passage, a connection unit arranged below said hook opening, and an energy absorption area arranged on a left side of said hook opening, wherein said female buckle and said passage are located on a right side of said energy absorption area;
a gate member, having a first end mounted on said main body and a second end comprising a male buckle, adapted for detachably coupled with said female buckle, so as to allow said gate member to open and close said passage: and
a detent member, coupled on said main body and maintained at a first position, so as for ensuring that said gate member closes said passage,
wherein when said detent member is operated and switched to a second position, a safety is disarmed, so that said gate member is operable for opening said passage, wherein when said detent member is armed when said gate member closes said passage, when said main body bears a designated torque, said energy absorption area allows said main body to distort in response, so as to ensure that said gate member still closes said passage, wherein said main body has a main arm, a hook arm, and the hook opening is defined by connecting said hook arm with a top end of said main arm, wherein the passage is provided and maintained between a free end of said hook arm and a right side of said main arm, wherein said hook arm has the female buckle arranged on the free end thereof, wherein said main arm has the connection unit arranged below said hook opening and the energy absorption area is arranged between said connection unit and said hook arm, and is a channel laterally passing through a left and right side of said main arm, wherein said main arm has a symmetrically shaped front board and back board, wherein an end of said hook arm is affixed between atop end of said front board and a top end of said back board in a clamping manner, wherein said connection unit has an intermediate block affixed between a bottom end of said front board and a bottom end of said back board in a clamping manner, wherein said hook arm and said intermediate block control and keep said energy absorption area between a back side of said front board and a front side of said back board, wherein said connection unit is formed by said intermediate block, a main bolt, and a breaking bolt, wherein said intermediate block has a covered portion and a bare portion, wherein said covered portion is clamped between the bottom end of said front board and the bottom end of said back board and affixed through a pinning of said main bolt and said breaking bolt, wherein the strength of said breaking bolt is lower than the strength of said main bolt, wherein said bare portion has a hanging hole penetrated thereon, wherein said anti-torque safety hook further comprising a spring mounted between said detent member and said intermediate block, so that said spring provides a predetermined force onto said detent member to grant said detent member a potential to stay at the first position.

* * * * *